US012807486B2

(12) United States Patent
Ezell

(10) Patent No.: US 12,807,486 B2
(45) Date of Patent: Nov. 24, 2026

(54) HYDROCARBON DECOMPOSITION TO HYDROGEN AND CARBON USING PLASMA INDUCED MOLECULAR VIRBRATIONS WITH AN ACTIVE CONTROL SYSTEM

(71) Applicant: Christopher Ray Ezell, Jenks, OK (US)

(72) Inventor: Christopher Ray Ezell, Jenks, OK (US)

(73) Assignee: Christopher Ezell, Jenks, OK (US)

( * ) Notice: Subject to any disclaimer, the term of this patent is extended or adjusted under 35 U.S.C. 154(b) by 288 days.

(21) Appl. No.: 18/365,773

(22) Filed: Aug. 4, 2023

(65) Prior Publication Data

US 2024/0409403 A1 Dec. 12, 2024

(51) Int. Cl.
*C01B 3/24* (2006.01)

(52) U.S. Cl.
CPC ........ *C01B 3/24* (2013.01); *C01B 2203/0861* (2013.01); *C01B 2203/1623* (2013.01)

(58) Field of Classification Search
None
See application file for complete search history.

(56) References Cited

U.S. PATENT DOCUMENTS 4,352,044 A 9/1982 Zhukov
6,245,309 B1 6/2001 Etievant
6,252,354 B1 * 6/2001 Collins ............ H01J 37/32174 156/345.28
6,884,326 B2 4/2005 Futamura
7,736,400 B2 6/2010 Rabovitser
8,021,448 B2 9/2011 Zhu
11,987,498 B2 5/2024 Aketagawa
2008/0044347 A1 * 2/2008 Roychoudhury ......... C01B 3/38 423/658.3
2022/0144631 A1 * 5/2022 Aketagawa ............... C01B 3/38

FOREIGN PATENT DOCUMENTS

GB 2613021 A * 5/2023 .............. H02J 15/50

OTHER PUBLICATIONS

Tuchin, Valery. (2015). Tissue Optics—Light Scattering Methods and Instruments for Medical Diagnostics (3rd Edition)—5.3 Vibrational and Raman Spectroscopies. SPIE. Retrieved from https://app.knovel.com/hotlink/pdf/id:kt00UBXJ72/tissue-optics-light-scattering/vibrational-raman-spectroscopies. (Year: 2015).*

* cited by examiner

*Primary Examiner* — Richard M Rump
*Assistant Examiner* — Zachary John Baum
(74) *Attorney, Agent, or Firm* — Daniel C. Pierron; Widerman Malek, PL

(57) ABSTRACT

This invention is a control system to be used in a plasma pyrolysis reactor. This control system is designed to significantly reduce the energy consumption of methane decomposition by utilizing frequency, waveshape, and voltage to minimize the energy required. Inlet gas streams to a plasma pyrolysis reactor can change seasonally, thus the optimal energy characteristics change. By using a control system to monitor these changes, and react to these changes, we are able to reduce the input power. This is significant as the cost of energy is a main driver for Hydrogen and Carbon production.

10 Claims, 1 Drawing Sheet

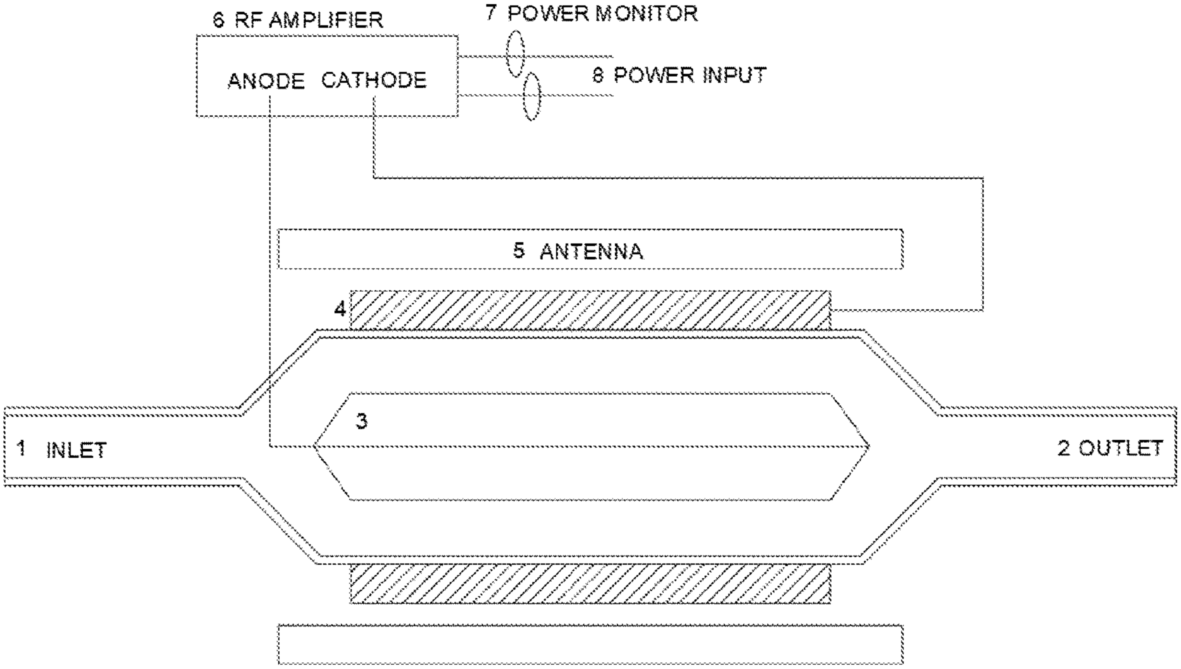
6 RF AMPLIFIER
ANODE CATHODE
7 POWER MONITOR
8 POWER INPUT
5 ANTENNA
4
3
1 INLET
2 OUTLET

HYDROCARBON DECOMPOSITION TO HYDROGEN AND CARBON USING PLASMA INDUCED MOLECULAR VIRBRATIONS WITH AN ACTIVE CONTROL SYSTEM

REFERENCE TO RELATED PATENTS

U.S. Patent Documents

| | |
|---|---|
| U.S. Pat. No. 4,352,044 A | Septemper 1982 |
| U.S. Pat. No. 6,245,309 B1 | June 2001 |
| U.S. Pat. No. 6,884,326 B2 | April 2005 |
| U.S. Pat. No. 7,736,400 B2 | June 2010 |
| U.S. Pat. No. 8,021,448 B2 | September 2011 |
| U.S. Pat. No. 0,144,631 A1 | May 2022 |

BACKGROUND OF THE INVENTION

Hydrogen is a promising fuel for people to decarbonize combustion. There are numerous problems with the production, transportation, and combustion of hydrogen. The cost to generate hydrogen limits it's availability. Any improvement to the energy consumption of energy greatly improves the economics. Conventional carbon steel pipe is unable to transport significant amounts of hydrogen without detrimental effects to the grain boundaries of the material. Combustion of hydrogen is higher than traditional temperatures of methane combustion, and must be blended with methane to accommodate many turbines in service.

Plasma pyrolysis is a technology that exists today. This process uses various types of plasma, various types of catalysts, and various designs of reactors. The current designs are limited by the energy required to decompose methane into hydrogen and carbon. Most designs today use a static radio frequency to achieve plasma, ignoring the absorption spectra of methane. There is one application, JP2019/017116, Kyohei, that uses a target frequency of the gas to achieve a lower energy consumption. This process works, but is limited due to the variable composition of the inlet gas feed and the variable composition of the gas in the reactor. Natural gas feeding a turbine can vary in composition by percentages (Methane, Ethane, CO2). This changes the optimum frequency of the system. After initiation, the decomposition of methane results in CH3, CH2, and other excited stated of methane, further changing the optimum frequency and voltage of the system.

The improvement claimed in this application is an active control system that tunes the frequency of the plasma to a minimum power by measuring power leakage and power consumption. By monitoring the energy of the plasma leaving the process, the control system is able to minimize the energy used in the process. Specifically, this process tunes the frequency increasing and decreasing to monitor for leakage. This ensures the process occurs in a dwell of energy consumption. To avoid a false minimum, the algorithm will periodically scan the spectrum to map energy losses.

To achieve a realistic distribution of hydrogen throughout the world, methane is a likely carrier. By utilizing end devices capable of converting hydrocarbons to carbon and hydrogen, existing infrastructure can be utilized without degrading effects to the current materials.

BRIEF STATEMENT OF THE INVENTION

This invention relates to the production of hydrogen and carbon from the plasma driven decomposition of a hydrocarbon stream. Hydrogen produced from this system is intended for use as a fuel source. The carbon produced from this system has numerous commercial, agricultural, and industrial applications. This patent specifically relates to the use of molecular vibrations and/or resonant structures of hydrocarbons to lower the overall required power for the decomposition of the hydrocarbons. This frequency is obtained by the use of an active control system to minimize the energy leakage. Once a minimum voltage is obtained, voltage may be adjusted to increase the conversion rate, or to accommodate higher pressures.

BRIEF DESCRIPTION OF THE DRAWINGS

FIG. 1 is a schematic view of a system for hydrocarbon decomposition according to an embodiment of the invention.

DETAILED DESCRIPTION OF THE INVENTION

Plasma pyrolysis reactors are well documented in various forms. This patent specifically improves the process, by implementing a control system that will improve the economics of the process. This control system controls the frequency and voltage applied to the reactor, by starting the system at a frequency based on theoretical optimums, then drifting the frequencies to a minimum power leakage.

To optimize the energy consumption of plasma decomposition, frequency is the largest driver of efficiency. The optimum frequency changes based on numerous factors including; composition of the inlet feed, composition of the degraded reactants, pressure, catalyst state, electrode spacing, and flow rate. The combination of these variables can be modelled for an estimated starting state for the reactor, but quickly become non optimized. This is where leakage detection and power monitoring are critical to the success of low cost hydrogen.

RF energy into the system is either absorbed into the hydrocarbon stream, into the materials of the reactor (Structure or Catalyst), or is released from the system. By placing an antenna around the system, losses can be measured and optimized. A second point of measurement is by measuring the current and voltage into the system. By measuring both parts of the system, general losses can be minimized.

After the system is online, the control system will periodically scan for optimum points. This is defined by a system range of frequencies based on the reactor design, pressure, and composition. The system can scan linearly increasing and decreasing, while mapping the optimum points, or can utilize more modern optimization algorithms. Once the optimum points are defined, the system will operate near the optimum frequency, constantly fluctuating the frequency to maintain minimum energy consumption.

The invention claimed is:

1. A method of using plasma induced hydrocarbon decomposition to produce hydrogen and carbon, the method comprising:

introducing a hydrocarbon feed gas into a reactor;

applying energy to the reactor at a source frequency correlating to one or more peaks of an absorption spectrum of the hydrocarbon feed gas; and decomposing the hydrocarbon feed gas via plasma to produce hydrogen and carbon;

wherein an active control system is used to minimize power consumption by changing the frequency and voltage of the energy, by using measured losses and measured energy input of the reactor;

wherein the measured losses are determined by placing an antenna around the reactor to measure RF energy released from the reactor.

2. The method of claim 1 wherein the energy is applied using a dielectric barrier discharge reactor, an inductively coupled plasma reactor, a capacitively coupled plasma reactor, or a photon source.

3. The method of claim 1 wherein the reactor operates at a temperature corresponding to a non-thermal plasma or a thermal plasma.

4. The method of claim 1 wherein a conversion percentage of the hydrocarbon feed gas is less than 100%.

5. The method of claim 1, wherein the measured losses and energy input are determined by measuring current and voltage into the reactor.

6. The method of claim 1, wherein the active control system periodically scans a range of frequencies to identify optimum points.

7. The method of claim 6, wherein the active control system operates near an optimum frequency while constantly fluctuating the frequency of the energy to maintain minimum energy consumption.

8. The method of claim 1, wherein the active control system periodically scans a spectrum to map energy losses to avoid a false minimum.

9. The method of claim 1, wherein the source frequency is initially set based on theoretical optimums and subsequently adjusted to minimize power leakage.

10. The method of claim 1, wherein after obtaining a minimum voltage for plasma generation, voltage is adjusted to increase conversion rate or accommodate higher pressures.

* * * * *